United States Patent [19]
Trigg et al.

[11] Patent Number: 5,855,842
[45] Date of Patent: Jan. 5, 1999

[54] PROCESS FOR PRODUCING A DENSE CERAMIC PRODUCT

[75] Inventors: Mark Brian Trigg, Ashburton; Chull Hee Oh, Knoxfield, both of Australia

[73] Assignee: Commonwealth Scientific and Industrial Research Organisation, Campbell, Australia

[21] Appl. No.: 947,923

[22] PCT Filed: Dec. 11, 1992

[86] PCT No.: PCT/AU92/00661

§ 371 Date: Aug. 3, 1994

§ 102(e) Date: Aug. 3, 1994

[87] PCT Pub. No.: WO93/12051

PCT Pub. Date: Jun. 24, 1993

Related U.S. Application Data

[63] Continuation of Ser. No. 539,047, Oct. 4, 1995, abandoned, which is a continuation of Ser. No. 244,835, Aug. 3, 1994, abandoned.

[30]        Foreign Application Priority Data

Dec. 13, 1991 [AU] Australia ................................. 0017

[51] Int. Cl.$^6$ ................................................ C04B 33/32
[52] U.S. Cl. .......................................... 264/654; 264/674
[58] Field of Search .................................. 264/625, 654, 264/674, 682

[56]                References Cited

U.S. PATENT DOCUMENTS 4,564,490 1/1986 Omori et al. ............................ 264/65
4,569,921 2/1986 Omori et al. ............................ 501/88
4,829,027 5/1989 Cutler et al. ............................ 501/89

FOREIGN PATENT DOCUMENTS

| 63095/90 | 9/1990 | Australia . |
| 1256459 | 6/1987 | Canada . |
| 1-76967 | 11/1989 | Japan . |
| 86-185381/29 | 2/1990 | Japan . |
| 89-003885/01 | 4/1991 | Japan . |
| 2 170 516 | 1/1986 | United Kingdom . |
| AU90/00518 | 10/1990 | WIPO . |

OTHER PUBLICATIONS

Phase Transformation and Thermal Conductivity of Hot Pressed Silicon Carbide Containing Alumina and Carbon--Tosikazu Sakai, Journal of the American Ceramic Society, vol. 71, No. 1, issued Jan. 1988, pp. C–7 to C–9.

International Search Report, International Application No. PCT/AU92/00661.

*Primary Examiner*—Christopher A. Fiorilla
*Attorney, Agent, or Firm*—Merchant, Gould, Smith, Edell, Welter & Schmidt, P.A.

[57]                ABSTRACT

A process for the production of dense polycrystalline silicon carbide shaped articles; includes (a) heating a powder compact containing silicon carbide and alumina or a precursor thereof to an intermediate temperature, and maintaining the said intermediate temperature for an extended dwell, and then (b) heating the product of step (a) to a higher temperature for sufficient time to produce a dense polycrystalline silicon carbide product.

24 Claims, 1 Drawing Sheet

PROCESS FOR PRODUCING A DENSE CERAMIC PRODUCT

This a File Wrapper Continuation of application Ser. No. 08/539,047, filed Oct. 4, 1995 now abandoned, which is a File Wrapper Continuation application Ser. No. 08/244,835, filed on Aug. 3, 1994 now abandoned.

This invention relates to a process for the production of dense polycrystalline silicon carbide shaped articles and the superior shaped articles produced by the process. In one aspect the invention provides a new firing cycle for the production of dense polycrystalline silicon carbide shaped articles. In accordance with this firing cycle, powder compacts containing silicon carbide and alumina or a precursor thereof are first heated to an intermediate temperature, as will be explained in more detail below. After an extended dwell at the intermediate temperature, the temperature is raised in a second stage to a higher temperature to complete the densification process.

In the second stage, magnesia or a precursor is thereof may optionally be present as a sintering assist, and the atmosphere is essentially carbon monoxide. It is preferred that the original compact contains magnesia, or a precursor thereof, but the magnesia may be introduced during the firing cycle. Depending upon the particular conditions, it may also be advantageous to have a controlled amount of carbon present, as will be explained in more detail below. In a preferred embodiment of the invention, the first stage is carried out in an inert atmosphere such as argon, and the atmosphere is changed after the intermediate temperature dwell, for example by purging the furnace chamber and introducing carbon monoxide for the remainder of the firing cycle.

BACKGROUND OF THE INVENTION

Shaped articles comprising high density polycrystalline silicon carbide are well known. They are characterised by excellent physical properties such as high resistance to thermal shock, abrasion and oxidation together with high levels of strength and thermal conductivity. It is this combination of properties which makes silicon carbide materials leading candidates for engineering applications. However, the production of satisfactory high density materials has been fraught with difficulties.

Early workers (eg. Alliegro, Coffin and Tinkepaugh J. Amer. Ceram. Soc., 39 [11] 386–89 [1956]) showed that silicon carbide could be hot pressed to high density bodies with the aid of sintering aids such as aluminium and iron, and aluminium plus one of the metals zirconium, boron or iron. It was further disclosed that for the hot pressing of silicon carbide, magnesium additions and magnesium and aluminium additions were ineffective, and impaired the densification process as compared to a control sample of silicon carbide, hot pressed under identical conditions with no additives or additions. Lange (J. Mater. Sci. (10 [1975] 314–320) disclosed the hot pressing of silicon carbide using alumina as the densification aid. The limitations of hot pressing for the attainment of dense bodies are well known.

The selection of suitable densification aids for the sintering of silicon carbide has been considered by Negita (J. Am. Ceram. Soc. 69[12]C308–10 [1986]). Using thermodynamic arguments it was found that metal additives such as boron, aluminium, iron, nickel and cobalt could be effective densification aids. Using these principles, alumina, beryllia, yttria, hafnia and rare earth oxides are considered to be potential densification aids as they do not decompose silicon carbide during sintering. Metal oxides including zirconia, calcia, magnesia are not considered suitable as they tend to decompose silicon carbide to metallic silicon. In addition the use of carbon with metal oxide additions was reported to be beneficial for oxides such as alumina, beryllia, yttria, rare earth oxides, calcia, zirconia, and hafnia. It is stated that the carbon is added to react with the said oxides to form the corresponding metal carbide and silicon metal. The formation of the metal carbides was seen as desirable. In the process according to the present invention, the formation of such metal carbides was not observed. Furthermore, in contrast to the work of Negita, in the current work it has been found that the reaction of carbon with the metal oxide densification aids is undesirable and impairs the densification of the bodies. This indicates that the role of carbon in the present work is different to that proposed by Negita and others. In addition, given the unstable nature of metal carbide phases, for some even in air at room temperature, the formation of such phases is seen as undesirable and are avoided in the present invention. This aspect will be discussed in greater detail for the calcia system.

The work of Cutler and Miller (U.S. Pat. No. 4,141,740) describes a process for a refractory product based on silicon carbide containing at least 1% by weight of aluminium nitride and at least 1% by weight aluminium oxycarbide. The presence of metal impurities (other than aluminium and silicon) were seen to be detrimental to the process and are limited to 0.1 percent by weight or less. No indication was given as to the properties of such bodies and the ease at which they can be made into dense bodies with desirable physical properties and the commercial utility of the process. Further work in this system was described by Virkar et al in International Patent application WO87/01693, where the pressureless sintering of silicon carbide-aluminium nitride-aluminium oxycarbide containing materials was described. A major drawback of the process as disclosed is that the materials must be heated at very rapid rates to minimize volatilisation of the active densification species. This could pose problems for the production of large parts in which differential sintering as a result of thermal gradients can lead to distortion and ultimately to micro cracking due to thermal stresses inevitably present as a result of the described firing cycles. This would make the maintenance of the desired physical properties difficult. In addition, the undesirable presence of aluminium oxycarbides in the final body may prove difficult to avoid.

In Suzuki et al. (U.S. Pat. No. 4,354,991) the use of aluminium oxide to densify silicon carbide is described. In the process as described the use of non-oxidative atmospheres is taught. These include nitrogen, carbon monoxide, helium and argon. It is taught that argon or helium are preferable and that the atmosphere should preferably contain aluminium, silicon or carbon. In one method, it is proposed that mixtures of these gases be fed into the reaction chamber with a carrier gas such as nitrogen, argon and helium. In another method, the use of a powder bed or sintered product capable of generating the gases around the silicon carbide article to be densified was disclosed. It was a teaching of the document that it is unnecessary to remove the silica present on the surface of the silicon carbide. In fact it was stated that it is feasible to add silica as a raw material. This is in contrast to the present invention where the presence of this phase has been found to exert a deleterious effect on the densification behaviour at high temperatures and will be explained later on. The fired bulk densities obtained were inferior to those achieved by the present invention. In addition, the sintering times were much longer. For a continuous process for the densification of bodies, the significantly longer reaction times for densification would result in lower production rates.

In the work of Fuentes U.S. Pat. No. 4,876,226 the use of alumina and calcia as densification aids for silicon carbide was disclosed. It was a requirement of the invention to form liquid phases comprising aluminium oxycarbides at the sintering temperatures to promote densification. The addition of calcia was to increase the amount of the aluminium oxycarbide liquids and enhance densification. It was further disclosed that the addition of free carbon is preferred. It is believed that in the system described by Fuentes, the addition of free carbon is to react with aluminium containing phases to produce or further enhance the formation of the oxycarbide phases which are a requirement for the process. The level of free carbon additions were prefereably greater than 0.4% by weight. No indication was given to an upper limit for the carbon addition. This is in contrast to the teachings of the present invention, where the reaction of carbon with the aluminate phase is believed to be detrimental to the densification process. It is claimed that the technique excludes the use of rare earths but no reference was given for their deletion. Indeed, in the work of Omori et al (U.S. Pat. No. 4,569,921) the use of calcia and precursors for the oxides of aluminium and rare earth elements for the pressureless sintering of silicon carbide was disclosed with excellent results. In addition, it has been reported by Foster et al (J. Am. Ceram. Soc. 39[1]-11[1956]) that aluminium carbide and aluminium oxycarbide, the latter at least required for the process as outlined, are very unstable towards both moisture and oxygen. They taught that these materials should not be used in applications where these species are likely to be encountered. In the process as disclosed, such aluminium oxycarbide species are a key element of the process. The presence of such species is expected to greatly degrade the performance and severely limit the suitability of the said materials. In the present invention, aluminium oxycarbides, such as $Al_4O_4C$ and $Al_2OC$, have not been observed and their presence is not a prerequisite for the process disclosed herein. Thus the process and product as disclosed herein overcomes significant disadvantages of the process as disclosed by Fuentes.

The use of rare earths and alumina as sintering assists for silicon carbide has been disclosed (eg see Mulla and Krstic Bull. Amer. Ceram. Soc. 70[3]439–443 [1991]). In order to obtain high density bodies, the components had to be encapsulated in closed threaded graphite crucibles sealed with graphite foil. It was revealed that bodies could be produced with over 95% of theoretical density and weight losses of less than 1 percent. When the same experiments were carried out without encapsulation, the resulting bodies obtained less than 80 percent of theoretical density and weight losses up to 20 percent were recorded. Culter and Jackson (pp 309–318 in Ceramics Materials and Components for Engines, Proceedings of the Third International Symposium, Las Vegas Nev. 1988) also disclosed the use of yttria and alumina for the sintering of silicon carbide. Although high density bodies could be produced, the recorded weight losses were high and increased with increasing temperature. The decomposition reactions between the sintering assists and the silicon carbide were cited as a major problem. As in the case of Mulla and Krstic only very short times were used, typically of 5 minutes duration at the maximum temperature. The requirement to subject samples to minimum times at high temperatures is considered difficult to carry out on a commercial scale especially for the manufacture of larger components or where large furnace loads are used.

This can lead to large thermal gradients giving rise to problems such as differential sintering, leading to distortion of the fired bodies. This would greatly reduce the application utility of the process.

DESCRIPTION OF THE INVENTION

This invention provides a dense silicon carbide product and a method of producing the same without the use of pressure assisted processes such as hot pressing or hot isostatic pressing, the use of boron or boron compounds and carbon, the use of powder beds or the requirement for sealed containers. It is an object of the present invention to overcome the difficulties of existing technologies and produce useful products based on silicon carbide. This is achieved by the addition of sintering assists, and by providing an environment in terms of temperature and atmosphere that is conducive to densification. It is believed that the densification of the powder compacts is a result of a liquid phase sintering mechanism (LPS).

In the sintering of silicon carbide by techniques such as LPS, it is believed that it is crucial to maintain the effective sintering aids within the body. In the temperature range at which densification occurs, these additives react to form a liquid phase into which silicon carbide has some degree of solubility. In the initial stages, the liquid which forms at high temperatures allows densification by particle rearrangement. This is usually followed by a solution precipitation step followed by a stage characterised by grain growth. If, as appears to be the case, it is the liquid phase that is facilitating the densification, the premature loss of sintering aids is to be avoided. The use of excessive amounts of sintering aids to compensate for the loss thereof is also to be avoided as this results in increased cost, and can also result in the deposition of unwanted species in the cooler parts of the furnace. In addition, the loss of sintering assists can result in compositional gradients. These species can be unstable with regard to the atmosphere and can result in damage to the furnace and make the manufacture of components hazardous. Thus, it is important in the efficient manufacture of components to minimise the loss of raw materials.

The use of powder beds in the manufacture of LPS silicon carbide is known. The role of a powder bed is to provide a suitable environment. However, there are major drawbacks to the use of powder beds. These are:

Additional cost of the powder bed.

Additional costs associated with the increased number of handling operations such as loading and (after the firing) unloading the samples from the powder bed.

Poor surface finish especially where the samples are in prolonged contact with the powder bed.

The powder bed by providing active species for the densification can result in warping or distortion of the bodies as a result of gradients of densification aids therein, and densification gradients which can also lead to warping and distortion of the bodies.

The use of sealed containers to encapsulate the bodies to avoid the loss of volatile constituents also imposes limitations for large scale production of bodies, as a result of additional costs associated with increased number of unit operations required to produce components, such as the requirement to load the samples into the sealed containers.

DETAILED DESCRIPTION

Although it will be clearly understood that we do not wish to be limited by any postulated or theoretical mechanism for the observed beneficial results of the process of the present invention, we do offer the following discussion of what is believed to be the underlying chemistry involved.

According to the present invention a dense product is produced which contains at least 65 weight percent silicon carbide with the remainder substantially an aluminate. Part or all of the aluminate may also optionally contain magnesium in the form of spinel. The spinel phase is not necessarily stoichiometric with respect to the magnesium to aluminium ratio. The preferred composition range, expressed as the equivalent amount of oxide, for the product is alumina 3 to 35 weight percent; and magnesia 0.01 to 5 weight percent. In addition, the product may optionally contain silicon, aluminium or glassy phases or a combination of the said phases. The presence of alumina in the α-corundum form is typical when the aluminium to magnesium ratio in the samples is high and or the firing temperatures in the upper part of the specified range are employed.

Useful materials can be produced when the sintering aids are added to finely divided silicon carbide powder and the resultant mixture can be processed using traditional ceramic processing techniques to form consolidated powder compacts. The said materials are heated using a two-stage firing cycle and densification of the body results. The materials can be conveniently densified in the temperature range of 1700° C. to 2200° C., with or without the application of pressure. It is appreciated that the application of pressure can be useful in reducing the temperature at which the densification is carried out in order to produce a dense body, but is not a prerequisite for the process.

It is thought that the additives interact to form a liquid which promotes densification by a liquid phase sintering process. The use of magnesium and aluminium (both in the form as either oxides or their precursors; or alternatively as a magnesium spinel or a mixture of the aforementioned species, facilitates densification and the ultimate formation of an aluminate grain boundary phase. Depending on the starting compositions and the firing cycle employed, the aluminate may be present in total or part as a magnesium aluminate (or magnesium spinel). Furthermore, magnesium spinel can exist as a solid solution $(Mgo)_x.(Al_2O_3)$, where x is less than or equal to 1. Thus the grain boundary phase can accommodate shifts in chemical composition without the formation of additional phases. This is an important consideration for a high temperature reaction such as the pressureless sintering process, where the control and maintenance of volatile species (such as magnesium and aluminium) could prove difficult and expensive to carry out in practice.

At the higher temperatures used to promote densification the said magnesium spinel which forms in the body or is deliberately added, may undergo further change leading to an increase in the aluminium to magnesium ratio. This may continue to the point where the magnesium is essentially lost from the body. It is also possible that aluminium may be lost from the bodies during the firing cycle. If the process continues still further, ultimately aluminium metal or aluminium alloy may be detected in the body.

The attainment of a suitable environment is a requirement for the successful densification of silicon carbide by the method of the present invention. It is an aim of the present invention to provide conditions conducive for the densification of the bodies. It is considered that the formation of suitable liquids is a requirement of the process to produce high density bodies. In this regard it is important that the active species, responsible for the densification of the body, are retained in the body until such times as the densification is completed or reaches such levels that other mechanism(s) can lead to the attainment of a high density bodies. This is common to liquid phase sintering techniques where it is a requirement that the liquid be stable. In addition, it is a condition that unwanted components are removed by such techniques as volatilisation or decomposition and formation of phases that assist or do not interfere with the densification processes.

There are number of conditions that must be satisfied in order to obtain useful products. These conditions relate to ensuring that the silicon carbide and the liquid phase responsible for densification, are stable at the densification temperature. At the high temperatures required for densification, the solid and liquid phases require vapour pressure of elements, sub oxides and other vapour species to remain stable. The bodies generate their own stable atmosphere through partial decomposition of the said phases, but this decomposition should not be such that the generation of the stable atmosphere depletes the liquid phase to such an extent that densification is so retarded or inhibited that it is not possible to make dense bodies.

It is advantageous to maintain a favourable effective sample volume to furnace volume, thus limiting the amount of decomposition of the solid and liquid phases to gaseous species and ensuring an adequate level of additives remain in the body to obtain a dense body. This coupled with a carbon monoxide atmosphere in the second stage of the process, are successfully used to suppress the amount of decomposition of these phases without the need to resort to other means, such as powder beds or the introduction of active species into the hot zone from external sources. The importance of this aspect will be illustrated with some of the findings of this investigation.

For the production of bodies with thicker cross sections, significant differences in fired bulk density can occur on the inside with respect to the outside of the body (coring). This can ultimately lead to cracking of the body after fabrication. It is believed this behaviour is the result of the presence of phase(s) that interfere with the densification processes by either changing the nature of the liquid phases or which decompose at the middle to higher temperatures used. The densification of the bodies is such that it is difficult to eliminate cores from the interior of the thicker bodies. From the foregoing it can be appreciated that the critical thickness above which the formation of cores is a problem will depend on a number of factors such as heating rate, stacking geometry of samples in the furnace, effective gas flow rate, level of porosity and pore size of the body.

The use of argon for the sintering of samples results in the formation of dense bodies. However, an unwanted competing reaction is the decomposition of the silicon carbide. It is considered that this is a consequence of the reaction of the sintering assists with the silicon carbide. This leads to the formation of silicon which condenses on the bodies with a deterioration of the surface finish. It can also lead to the condensation of silicon on the contact points of the samples with furnace furniture or other bodies making the removal or separation of the bodies extremely difficult. It is anticipated that the generation of silicon is the result of the unwanted reaction of alumina with the silicon carbide (for example see reaction 1):

$$2SiC + Al_2O_3 \rightarrow 2Si_{(l)} + Al_2O_{(g)} + 2CO_{(g)} \qquad (1)$$

The condensation of the silicon can be avoided by the use of an atmosphere containing carbon monoxide. This leads to a greatly improved surface finish. To suppress reaction (1), at the upper end of the temperature range used for the densification, a partial pressure of carbon monoxide greater than one atmosphere is required. This temperature is estimated to be of the order of 2100° C. It has been found that at low temperatures there are unfavourable reactions between the powder compacts and the cabon monoxide furnace atmosphere. It is anticipated that below roughly 1550° C. the following reaction is thermodynamically feasible and can proceed left to right.

$$SiC+2CO \rightarrow SiO_2+3C \quad (2)$$

Above roughly 1550° C. in one atmosphere of carbon monoxide reaction 2 goes from right to left (see reaction 3).

$$SiO_2+3C \rightarrow SiC+2CO \quad (3)$$

In addition, it is also possible that some of the silica formed by reaction 2 can react according to reaction 4.

$$SiC+SiO_2 \rightarrow 2SiO_{(g)}+C \quad (4)$$

Further, the free carbon present can react with the aluminate phase leading to its decomposition and impairing the densification process (see reaction 5).

$$Al_2O_3+2C \rightarrow Al_2O_2O_{(g)}+2CO \quad (5)$$

It must be appreciated, that as a raw material, the silicon carbide powder is inevitably covered by an oxide layer of silica. As silica is detrimental to the densification of bodies, it must be removed. This can be achieved by decomposition to gaseous species such as silicon monoxide (see reaction 6).

$$2SiO_2 \rightarrow 2SiO_{(g)}+O_{2(g)} \quad (6)$$

For thinner bodies this reaction can proceed with the silica being removed by a decomposition reaction such as reaction 6. However, for thicker bodies the time required to remove this phase is appreciable. An alternative is the deliberate addition of carbon to react with the silica phase (reaction 3) to produce silicon carbide in the lower to mid temperature ranges of the firing cycle. Depending on the thickness of the components, stacking geometry and the furnace configuration the use of dwells can prove beneficial to ensure that this phase is removed. The carbon addition should be added such that it is sufficient to remove the silica phase only to prevent unwanted reactions such as reaction 5. The dwells or slow heating rates are also important to ensure that the amount of gas liberated, does not cause a pressure build up greater than the cohesive strength of the compact, leading to the formation of cracks. The use of slow heating rates is in to contrast with much of the teachings of the prior art.

Thus the presence of either or both the silica or carbon at the higher temperatures at which densification occurs, react to produce an unstable phase or phases. It is believed that internal stresses are generated within the body when the internal pores are closed off from the outside atmosphere. At high temperatures these stresses are sufficient to overcome the cohesive strength of the compact, resulting in the rupture of the body. This manifests itself in the bodies after firing exhibiting macro cracks.

The use of nitrogen for the densification of bodies is not suitable as a result of unfavourable reaction of the constituents of the bodies with the atmosphere to form stable compounds. These compounds reduce the amount of liquid present at high temperatures available for densification. It is considered that this is the result of the reaction of alumina with the silicon carbide in a nitrogen atmosphere to produce aluminium nitride. The formation of stable aluminium nitride is accompanied by a corresponding decrease in the amount of liquid phases necessary to allow densification to proceed by liquid phase sintering. A possible reaction is as follows:

$$3SiC+2Al_2O_3+2N_{2(g)} \rightarrow 4AlN+3SiO_{(g)}+3CO_{(g)} \quad (7)$$

This demonstrates the importance of maintaining the presence of the liquid phase at least until densification is essentially completed.

It has been found that the use of an inet atmosphere below 1550° C. and preferably at least 1600° C., but below the temperatures at which the onset of the unwanted reactions such as reaction 1 occur, is beneficial for the production of useful products. Thus at the temperatures at which there are unfavourable reactions between the silicon carbide based bodies and the carbon monoxide atmosphere, the use of an inert atmosphere such as argon or possibly nitrogen can be used. Above this temperature the furnace chamber is purged and carbon monoxide is introduced into the hot zone for the remainder of the firing cycle. The temperature in the reaction zone is such that the unwanted and detrimental reaction which leads to cracking of the body does not take place. In addition, the unwanted formation of silicon on the body is avoided.

An alternative is to use reduced pressure in the furnace chamber below 1550° C. Thus the unwanted reactions of carbon monoxide with the compacts is avoided. Above this temperature, carbon monoxide is introduced into the reaction chamber to prevent the unwanted formation of silicon at high temperatures.

When it is the intention to produce bodies with thicker cross sections, it has been found that it is advantageous to take steps to deliberately remove the silica from the system as this phase, or the oxide-based reaction product formed from the said phase with other phases present, interferes with the uniform densification of the said bodies. For such bodies it can prove difficult to remove this phase by processes such as decomposition and diffusion. This phase as described can persist at higher temperatures. It has been found that carbon added according to equation (3) to react with the silica present on starting materials is beneficial in eliminating the presence of low density cores in the fired samples. Care has to be taken to ensure that the evolution of gaseous species expected to be carbon monoxide does not lead to the cracking of the bodies. Further to this it has been found beneficial to hold the sample at a temperature at which the reaction (3) is feasible and can proceed left to right at an appreciable rate to ensure that the reaction is essentially complete before heating to a higher temperature but the rate of release does not lead to cracking of the bodies. Note, it is thought that reaction 3 should be essentially completed before heating above the equilibrium temperature for the reaction in one atmosphere of carbon monoxide. Under these conditions the generation of carbon monoxide can exceed one atmosphere and produce conditions which are condusive to cracking. Adding too much carbon according to reaction (3) for the amount of silica present leads to an observed decrease in the fired bulk density. It is believed this is as a result of the unwanted reaction of the residual carbon with oxides phases. This is in contrast to the work reported by Fuentes where the reaction of carbon with aluminium containing phases to produce oxycarbides is beneficial.

It is hypothesised that when carbon monoxide atmospheres are used exclusively, the use of extended dwells above the 1600° C. may overcome the problems associated with the use of this atmosphere at low temperatures that manifests itself in the macro cracking of the samples. It is the intention that the use of an interrupted firing cycle with a dwell above that temperature at which the carbon monoxide adversely reacts with the bodies but below the temperatures at which densification occurs leading to sealing off of the internal pores from the surface, thereby trapping volatile products in the bodies could prove advantageous. It is speculated that the use of temperature dwells above about 1550° C. say 1600° C., but below the onset of extensive densification, in particular before sealing of porosity of the bodies, estimated to be around 1900° C. could prove to be effective in preventing cracking. The firing cycle would be continued after such times as the unwanted species have been removed and the sample would then be heated to the final sintering temperature to densify the powder compact into a dense useful body.

The importance of the requirement to retain the densification aids has been discussed. At the high temperatures used for the densification of the bodies, the vapour pressures of the various elements and other species can be significant. A consequence of this is to limit the unwanted reactions. In a static environment, the vapour pressure of a species will be determined by thermodynamic and kinetic considerations. At the temperatures used, the rates of the reactions are typically rapid and thus the main consideration are the thermodynamics of the reactions. The amount of material in the hot zone is an important variable. If insufficient material is fired, the amount of decomposition (reflected in the weight loss after firing) will be unacceptable and in extreme cases densification of the body will not be achieved. The decomposition is the result of the generation of the vapour species in the atmosphere. The actual partial pressure of the species can be predicted using thermodynamic calculations. The vapour pressure is thus limited to either the equilibrium partial pressure or until all the phase in question is consumed in trying to establish the equilibrium partial pressure. Depending on parameters such as the effective furnace volume and its construction, as outlined previously, it is possible to limit the amount of decomposition and generation of a stable partial pressure of volatile species without significantly changing the starting composition of the samples and adversely affecting the densification of the body. Furthermore, by incorporation of some of the gaseous reaction products, specifically carbon monoxide, into the furnace atmosphere from external sources it is possible to minimise decomposition of the samples using Le Chatelier principle.

A method of forming a dense silicon carbide product is disclosed without the use of boron, or boron containing compounds and carbon associated problems of uncontrolled grain growth degrading the physical properties or alternatively the use of powder beds or the use need to introduce active densification aids into the furnace chamber via the furnace atmosphere.

The present invention will be further illustrated by examples in a non limiting manner.

EXAMPLES

Figure 1:
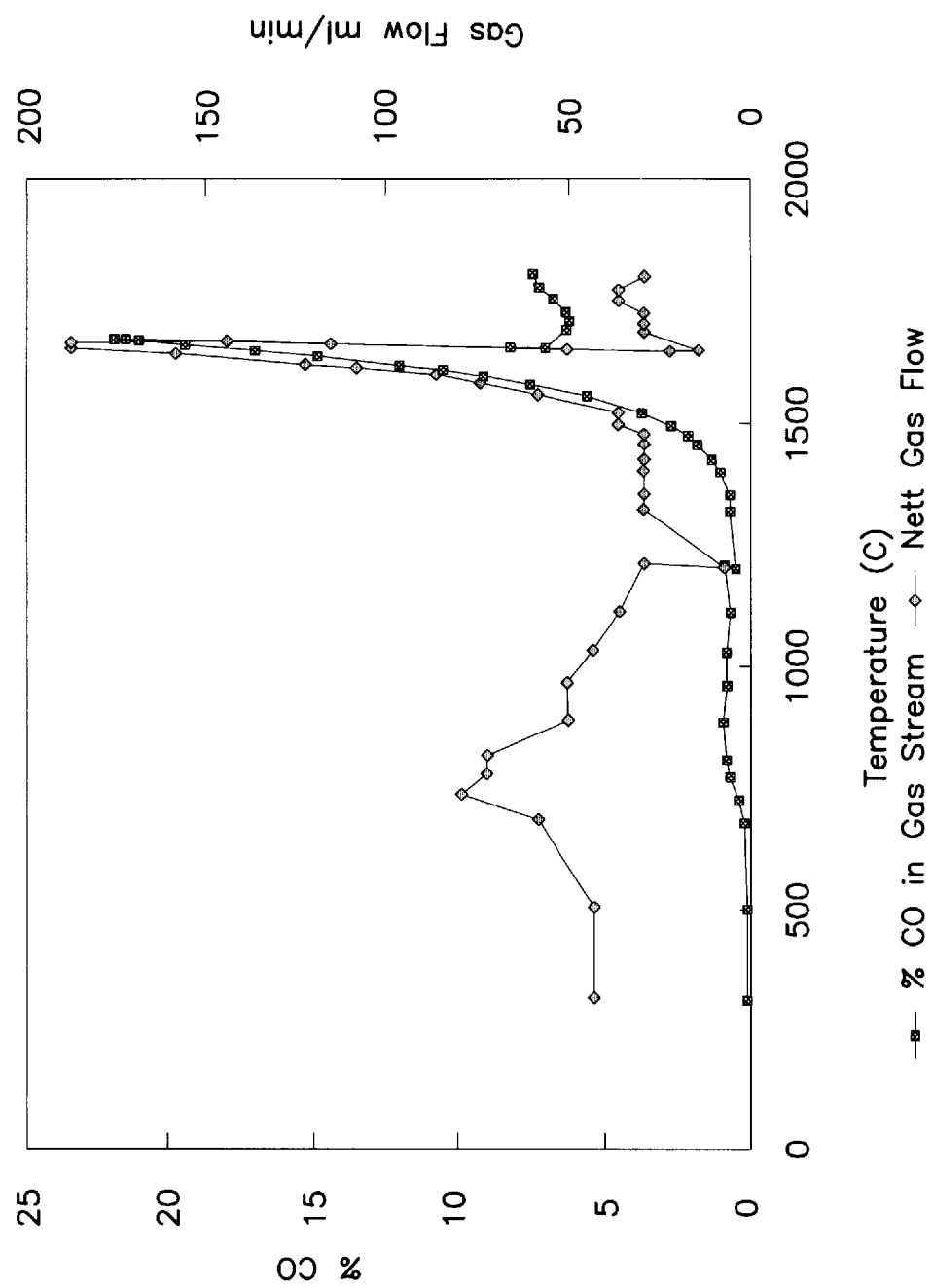
FIG. 1 illustrates data relevant to Example 26 below.

In the following examples all quantities are expressed in parts by weight, unless otherwise specified.

Example 1

The raw materials used were a silicon carbide from Lonza known as grade UF10; alumina from Alcoa known as grade A16SG; and magnesia from Ajax (Analytical Grade). The powders were weighed and ball milled using silicon carbide milling media. The conditions used for this operation are shown in table 1.

TABLE 1

| Conditions used for ball milling operation | |
|---|---|
| Time | 16 hours |
| Powder | 300 g |
| Milling Media | 1500 g |
| Fluid | 600 ml iso-propanol |
| Binder | 2 wt % |

After milling, the milling media was separated from the slurry which was subsequently spray dried. The powder was unaxially pressed using a steel die and punch set and cold isostatically pressed at a pressure of 150 MPa into a 70 mm square tile. The sample was then heated in air to 400° C. and held for 5 hours to remove the binder.

The sample was placed in a graphite work box with a loose fitting lid. The work box was heated in a graphite resistance furnace in an atmosphere of argon. At 1600° C. the furnace was evacuated and backfilled with carbon monoxide (see table 2). The specimen after firing had a smooth surface finish. The starting compositions and results are given in table 3.

TABLE 2

| Firing Cycle |
|---|
| Heat at 1400° C. min$^{-1}$ in Ar |
| Hold for 60 minutes |
| Heat to 1600° C. at 50° C. min$^{-1}$ |
| Hold for 30 minutes |
| Evacuate and backfill with CO |
| Heat to 1900° C. at 5° C. min$^{-1}$ |
| Heat to 2030° C. at 2.5° C. min$^{-1}$ |
| Hold for 60 minutes |
| Cool at 10° C. min$^{-1}$ |

TABLE 3

| | Sample Details | | | |
|---|---|---|---|---|
| Example | 1 | 2 | 3 | 4 |
| SiC | 87.8 | 87.8 | 87.8 | 87.8 |
| Al$_2$O$_3$ | 10.7 | 10.7 | 10.7 | 10.7 |
| MgO | 1.4 | 1.4 | 1.4 | 1.4 |
| Atmosphere | Ar/CO | Ar | CO | N$_2$ |
| Mass (g) | 164 | 174 | 179 | 147 |
| GBD(g · cc$^{-1}$) | 1.70 | 1.69 | 1.72 | 1.75 |
| FBD(g · cc$^{-1}$) | 3.16 | 3.08 | 3.16 | 2.07 |
| Wt Change % | −5.9 | −8.7 | −8.2 | −10.7 |
| Comments | 1 | 2, 3 | 4 | |

Where
1 Good surface finish
2 Silicon on surface
3 Poor surface finish
4 Cracked
5 Sample porous
GBD Green Bulk Density
FBD Fired Bulk Density

Comparative Example 2

The specimen preparation and the firing cycle were the same as for Example 1 with the exception that there was no evacuation step with backfill at 1600° C. and an argon atmosphere was used exclusively. After firing the specimen had surface deposits of silicon (see table 3).

The surface finish of the specimen was rough in comparison the specimen prepared according to example 1.

Comparative Example 3

The specimen preparation and the firing cycle were the same as for Example 2 with the exception that carbon monoxide was used for the complete firing cycle.

After the firing operation, the surface finish of the specimen was the same as example 1, however, the sample was badly macro cracked and distorted (see table 3).

Comparative Example 4

The specimen preparation was the same as Example 2 except that a disc 65 mm in diameter was used. The firing cycle was the same as Example 2 except that nitrogen was used. After the firing the sample had not densified to any appreciable extent (see table 3).

From the results in table 4 it can be seen the advantage of the two stage firing cycle. This results in a higher fired bulk density than the use of argon or nitrogen atmospheres and eliminates the macro cracking observed with the use of carbon monoxide only atmospheres. In addition, it is possible to use relatively slow firing cycles and still produce useful components. This is important for the mass production of samples using large furnace loads or the manufacture of large components where it is not often not practical or feasible to use rapid heating rates.

Comparative Examples 5–8

Samples were prepared according to Example 1 with the exception that discs 65 mm in diameter were used. The firing cycle used was identical to that used for Example 3 except for the dwell time at the maximum temperature. The results of the firings are given in table 4.

TABLE 4

| | Sample Details | | | |
|---|---|---|---|---|
| Example | 5 | 6 | 7 | 8 |
| SiC | 87.8 | 87.8 | 87.8 | 87.8 |
| Al$_2$O$_3$ | 10.7 | 10.7 | 10.7 | 10.7 |
| MgO | 1.4 | 1.4 | 1.4 | 1.4 |
| Atmosphere | CO | CO | CO | CO |
| Mass (g) | 147 | 147 | 147 | 147 |
| GBD(g · cc$^{-1}$) | 1.73 | 1.78 | 1.78 | 1.77 |
| Time (min) | 0 | 30 | 45 | 60 |
| FBD(g · cc$^{-1}$) | 2.86 | 3.02 | 3.07 | 3.13 |
| Wt Change % | −4.8 | −6.2 | −7.5 | −8.7 |
| Comments | | | | Cracked |

From the results listed in table 4, cracking only occurs at the later stages of the densification. Furthermore, it is thought that this behaviour occurs after the sample has reached the closed porosity stage. It is well known that there is a general inverse relationship between the level of porosity and strength for such materials. The inability to produce crack free bodies with low levels of porosity would greatly limit the application of such materials.

Comparative Examples 9–13

The samples were prepared according to the method of Example 1, with the exception that 25 mm discs were used. For samples heated to 1400° C. and higher in the atmospheres indicated, the samples were held at this temperature for 60 minutes prior to heating the maximum temperature. Samples 9, 11 and 12 were heated to the maximum temperature and cooled. The results of the firing are given in table 5.

TABLE 5

| | Sample Details | | | | |
|---|---|---|---|---|---|
| Example | 9 | 10 | 11 | 12 | 13 |
| SiC | 87.8 | 87.8 | 87.8 | 87.8 | 87.8 |
| Al$_2$O$_3$ | 10.7 | 10.7 | 10.7 | 10.7 | 10.7 |
| MgO | 1.4 | 1.4 | 1.4 | 1.4 | 1.4 |
| Atmosphere | CO | CO | CO | CO | Ar |
| Max. Temp (°C.) | 1100 | 1400 | 1600 | 1900 | 1409 |
| GBD(g · cc$^{-1}$) | 1.72 | 1.74 | 1.75 | 1.73 | 1.72 |
| FBD(g · cc$^{-1}$) | 1.72 | 1.82 | 1.81 | 2.09 | 1.72 |
| Wt Change % | −0.0 | +6.2 | +3.8 | −2.8 | −0.9 |
| Colour | Grey | Black | Black | Grey | Grey |

From the results of Examples 10 and 11 (see table 5), it can be seen that heating the samples in a carbon monoxide atmosphere at 1400° C. results in a weight gain. It is thought that the colour change of the samples from grey in the as pressed state to black, was the result of carbon formation within the samples. Furthermore, the formation of carbon occurs by oxidation of the silicon carbide according to reaction 2. From the results of Example 9, the weight change behaviour is not the result of the deposition or cracking of the carbon monoxide within the samples. Heating of the samples to higher temperatures results in a weight loss and colour change from black to the original grey colour (see Example 12). This behaviour is attributed to the carbothermal reduction involving the carbon and silica formed at lower temperatures according to reaction 3. It is thought that the presence of the silica has an adverse effect on the densification of silicon carbide. For a sample heated in an argon atmosphere (Example 13), there was no weight increase or colour change, indicating no reaction between the sample and the atmosphere.

Comparative Examples 14–17

The effect of additives on the oxidation of silicon carbide in a carbon monoxide atmosphere was studied. The results are given in table 6.

TABLE 6

| Effect of composition on weight change behaviour in CO at 1400° C. for 60 minutes | | | | |
|---|---|---|---|---|
| Example | 14 | 15 | 16 | 17 |
| SiC | 100 | 90.0 | 98.6 | 87.8 |
| Al$_2$O$_3$ | 0 | 10.0 | 0 | 10.8 |
| MgO | 0 | 0 | 1.4 | 1.4 |
| Mass(g) | 5 | 5 | 5 | 5 |
| GBD(g · cc$^{-1}$) | 1.65 | 1.72 | 1.67 | 1.68 |
| FBD(g · cc$^{-1}$) | 1.66 | 1.73 | 1.72 | 1.80 |
| Wt Change % | +0.8 | +0.9 | +5.4 | +9.2 |

Silicon carbide powder, with and without the addition of alumina is relatively stable under these conditions as evidenced by the negligible weight changes. By contrast, the addition of magnesia results in a significant increase in weight being observed after firing. It is believed that this behaviour is the result of the reaction of the additives with the silica layer on the silicon carbide. This provides a rapid transport mechanism for the oxygen through the said layer to the silicon carbide.

Examples 18–20

The effects of residual silica, with and without the presence of free carbon, on the densification behaviour was studied. The samples were prepared as outlined for Example 5. The resulting powder slurries were spray dried and green discs (65 mm diameter) were unaxially pressed at 35 MPa and wet bag CIP at 150 MPa.

The samples were fired in an atmosphere of carbon monoxide atmosphere at 1400° C. to form silica and carbon (Example 18-a and 19-a). Example 18-a was subsequently heated to 600° C. in air to remove the carbon, and the product is designated Example 18-b.

TABLE 7

Sample Details

| Example | 18-a | 19-a | 18-b |
|---|---|---|---|
| SiC | 87.8 | 87.8 | 87.8 |
| $Al_2O_3$ | 10.7 | 10.7 | 10.7 |
| MgO | 1.4 | 1.4 | 1.4 |
| Atmosphere | CO | CO | Air |
| Max Temp (°C.) | 1400 | 1400 | 600 |
| Mass (g) | 177 | 178 | 187 |
| Wt Change % | +5.4 | +5.4 | −2.8 |
| Comments | 1 | 1 | 2 |

Where
1 Colour Black
2 Light Grey

The results show that firing in a carbon monoxide atmosphere resulted in an increase in the weight of the sample. In addition the sample changed colour from a light grey to a black colour. This change in colour was attributed to the formation of carbon in the sample. After heating at 600° C. in air (Example 18-b) there was a decrease in the weight of the sample and the colour changed back to its original colour. However, there was a net weight gain observed from the sample after the carbon monoxide and air firing. This was attributed to the formation of silica from the silicon carbide.

These samples (18-b and 19-a) were heated using the firing cycle given in table 8, and the products are designated 18-c and 19-b respectively.

TABLE 8

Summary of Firing Cycles

Heat to 1400° C. at 10° C. min$^{-1}$ in Ar
Hold at 1400° C. for 60 minutes
Heat 1400° C. to 1600° C. at 5° C. min$^{-1}$
Hold at 1600° C. for 30 minutes
Evacuate to 1 mm Hg and fill with CO
Heat 1600° C. to 1900° C. at 5° C. min$^{-1}$
Heat 1900° C. to 2030° C. at 2.5° C. min$^{-1}$
Hold at 2030° C. for 60 minutes
Cool to room temperature at 10° C. min$^{-1}$
until the natural cooling rate takes over.

The results are given in table 9.

TABLE 9

Sample Details

| Example | 18-c | 19-b | 20 |
|---|---|---|---|
| SiC | 87.8 | 87.8 | 87.8 |
| $Al_2O_3$ | 10.7 | 10.7 | 10.7 |
| MgO | 1.4 | 1.4 | 1.4 |
| Mass (g) | 182 | 188 | 178 |
| FBD (g · cc$^{-1}$) | 2.94 | 3.16 | 3.19 |
| wt Change % | −11.5 | −10.0(−5.1)$^2$ | −5.2 |
| Comments | 1 | | |

Comments
Where
1 Badly distorted
2 weight loss for sample before CO firing.

The results demonstrate the adverse effects of silica on the densification of silicon carbide. Example 18-c (oxidised in a carbon monoxide atmosphere and subsequently heated in air to remove the carbon), underwent a large weight loss after densification at high temperature. The final bulk density was relatively low and the microstructure of the sample was characterised by porous regions. Example 19-b (fired in carbon monoxide atmosphere to 1400° C. and refired using the two stage firing cycle), also exhibited a large weight loss. By contrast, the fired bulked density obtained after firing was comparable to the two stage firing. For Example 19-b, it is believed that the silica and carbon formed during the first firing cycle to 1400° C., reacted to form SiC and carbon monoxide in the argon atmosphere in the second firing. It should also be noted that the overall weight change (for both firings) for Example 19 was very similar to that for Example 20 fired using the two stage firing cycle. This demonstrates the adverse effect of silicon carbide on densification and the its is possible to produce high density samples in a carbon monoxide atmosphere if the said phases which is inevitable formed at lower temperatures is removed from the body prior to the high temperature densification step.

Examples 21–25

To confirm silica that has an adverse effect on the densification of silicon carbide, free carbon was added to react with the silica. The same source of silicon carbide and magnesia as used for Example 1 were used to produce the samples. The alumina used was obtained from Alcoa was known as grade A1000 and the carbon source was a phenolic resin. The powders were batched and ball milled using silicon carbide milling media (see table 10).

TABLE 10

Milling Conditions

| Time | 16 hours |
|---|---|
| Powder | 350 g |
| Balls | 1500 g SiC |
| Fluid | 700 ml iso propanol |

The compositions of the batches are given in table 12. Note the ratio of Si:Al:Mg was kept constant for each mix. The weight loss after pyrolysis for the phenolic resin was 45.6%. Assuming a surface oxide layer of 3 weight percent for the silicon carbide, 1.8 g of carbon would be required for each 100 g of silicon carbide for conversion of the said silica layer to silicon carbide.

TABLE 11

Composition in Parts

| Example | 21 | 22 | 23 | 24 | 25 |
|---|---|---|---|---|---|
| SiC | 89.0 | 89.0 | 89.0 | 89.0 | 89.0 |
| $Al_2O_3$ | 10.0 | 10.0 | 10.0 | 10.0 | 10.0 |
| MgO | 1.0 | 1.0 | 1.0 | 1.0 | 1.0 |
| Resin | 0.0 | 1.6 | 3.2 | 4.9 | 6.5 |
| (C) | (0.0) | (0.9) | (1.8) | (2.6) | (3.5) |

The resulting powder slurries were spray dried and green discs (65 mm diameter and mass 250 g) were unaxially pressed at 35 MPa and wet bag CIP at 150 MPa. The samples were heated in nitrogen to pyrolyse the resin and form free carbon (see table 12).

TABLE 12

Curing and Pyrolysis Conditions in Nitrogen

Heat to 100° C. at 30° C. h$^{-1}$
Hold for 1 h
Heat to 150° C. at 30° C. h$^{-1}$
Hold for 1 h
Heat to 600° C. at 50° C. h$^{-1}$
Hold for 1 h
Cool at 200° C. h$^{-1}$ Details of the firing cycle are given in table 13.

TABLE 13

Summary of Firing Cycles

Heat to 600° C. at 5° C. min$^{-1}$ in Ar
Heat 600° C. to 1400° C. at 10° C. min$^{-1}$
Heat 1400° C. to 1550° C. at 5° C. min$^{-1}$
Hold at 1550° C. for 30 minutes
Heat 1550° C. to 1650° C. at 5° C. min$^{-1}$
Hold at 1650° C. for 30 minutes
Evacuate to 1 Hg and fill CO gas
Heat 1650° C. to 1900° C. at 5° C. min$^{-1}$
Hold at 1900° C. for 60 minutes
Heat 1900° C. to 2030° C. at 2.5° C. min$^{-1}$
Heat 2030° C. to 2060° C. at 1.5° C. min$^{-1}$
Hold at 2060° C. for 30 minutes
Cool to room temperature at 10° C. min$^{-1}$
until the natural cooling rate takes over.

The results of the firing are listed in table 14.

TABLE 14

Effect of free carbon content on densification using a two stage firing

| Example | 21 | 22 | 23 | 24 | 25 |
|---|---|---|---|---|---|
| SiC | 89.0 | 89.0 | 89.0 | 89.0 | 89.0 |
| $Al_2O_3$ | 10.0 | 10.0 | 10.0 | 10.0 | 10.0 |
| MgO | 1.0 | 1.0 | 1.0 | 1.0 | 1.0 |
| Resin | 0.0 | 1.6 | 3.2 | 4.9 | 6.5 |
| Mass (g) | 245 | 248 | 247 | 247 | 246 |
| GBD(g · cc$^{-1}$) | 1.69 | 1.70 | 1.70 | 1.71 | 1.72 |
| Carbon Content | 0 | 0.9 | 1.8 | 2.6 | 3.5 |
| FBD(g · cc$^{-1}$) | 3.13 | 3.20 | 3.19 | 3.12 | 3.04 |
| Wt Change % | −6.3 | −5.8 | −5.7 | −6.3 | −6.3 |
| Comments | 1 | 2 | 2 | 2 | 2 |

Comments
Where
1 Low density core
2 Uniform

From the results in table 14, can be seen that the addition of small amounts of carbon greatly enhances the level of fired bulk density obtained (Examples 21 and 22). For higher levels of carbon addition, there is a decrease in fired bulk density (Examples 24 and 25). It is believed that this behaviour is the result of the unfavourable reaction of the carbon at high temperatures. Thus there exists an optimum range for the carbon content. It is important to note that for thinner samples the addition of carbon was not found to be necessary in order to produce high fired bulk density products. It is believed that for these samples the silica layer is able to decompose and can be removed from the powder compact. This becomes more difficult with increasing thickness of the samples, as it requires considerable time to decompose and remove the unwanted oxide from the powder compact.

Example 26

The reaction of the minor secondary phases was studied to determine the decomposition behaviour in regards to the liberation of gaseous phases such as carbon monoxide. The raw materials used to produce the sample were silica from Pennyslvania Glass Sand Corporation known as Min-u-Sil grade 5 micron; alumina from Alcoa was known as grade A1000, magnesia from Ajax Chemicals (analytical grade) and the carbon source was a phenolic resin. The oxide only powders were batched and ball milled. The resin was added as a separate step to the pre milled and spray dried oxide powders. A green discs (38 mm diameter and mass 60 g) was unaxially pressed to form a compact. The starting composition used was formulated to correspond to the expected oxides and free carbon present in Example 22 and is given in table 15.

TABLE 15

Composition of Example 26

| Component | Parts | Expected Oxide Composition (Example 22) |
|---|---|---|
| $SiO_2$ | 17.5 | 2.7 |
| $Al_2O_3$ | 65.4 | 10.0 |
| MgO | 6.5 | 1.0 |
| Resin | 10.6 | — |
| (Carbon) | (5.7) | (0.9) |

The resin in the sample was pyrolysed to carbon according to the method outlined in Example 22. Details of the firing cycle are given in table 16. The sample was fired in an open crucible in a graphite tube furnace. The net gas flow rate and the CO content were continuously measured.

TABLE 16

Summary of Firing Cycle

Heat to 600° C. at 10° C. min$^{-1}$ in Ar gas
Heat 1400° C. to 1650° C. at 5° C. min$^{-1}$
Hold at 1650° C. for 30 minutes
Cool to room temperature at 10° C. min$^{-1}$
until the natural cooling rate takes over.

The results obtained during the firing are shown in FIG. 1. The results indicate a small amount of carbon monoxide was liberated at 700° C. with a corresponding increase in the net gas flow rate. The main out gassing started at 1300° C. and was rapid above 1500° C. The reaction was completed in a short time. The composition before and after firing is given in table 17.

TABLE 17

Atomic Ratios for Example 26

| Element | Initial Ratio | Final Ratio |
|---|---|---|
| Al | 1.00 | 1.00 |
| Si | 0.23 | 0.20 |
| Mg | 0.13 | 0.12 |
| C[1] | 0.42 | 0.01 |

Notes
(1) Free Carbon

The results indicate that the major change is the loss of the free carbon as carbon monoxide. There was also a small loss of silicon. This indicates that extreme care should be taken with the use of carbon to ensure that the samples are not damaged by excessive out gassing. The use of a slow heating rate or a dwell in this critical temperature range (of roughly 1300° C. to 1600° C.) can be used to overcome any adverse affects of this phenomena. The use of instruments such as gas flow meters or carbon monoxide detectors can be used to monitor the outlet gas streams to prevent rapid out gassing in the components being fired by interrupting the firing cycle at the critical points.

Examples 27–29

The effect of firing cycle was also examined for thick specimens. The composition and the sample preparation was the same as Example 22. The firing cycles used are summarised in table 18 and the results of the firing in table 19.

TABLE 18

| Summary of Firing Cycles | I | II |
|---|---|---|
| Heat room temperature to 600° C. at 5° C. min$^{-1}$ in Ar | Y | Y |
| Heat 600° C. to 1400° C. at 10° C. min$^{-1}$ | Y | Y |
| Heat 1400° C. to 1550° C. at 5° C. min$^{-1}$ | Y | Y |
| Hold at 1550° C. for 30 minutes | Y | N |
| Heat 1550° C. to 1650° C. at 5° C. min$^{-1}$ | Y | Y |
| Hold at 1650° C. for 30 minutes | Y | Y |
| Evacuate to 1 mm Hg and fill | Y | Y |
| Introduce CO gas | Y | Y |
| Heat 1650° C. to 1900° C. at 5° C. min$^{-1}$ | Y | Y |
| Hold at 1900° C. for 60 minutes | Y | N |
| Heat 1900° C. to 2030° C. at 2.5° C. min$^{-1}$ | Y | Y |
| Heat 2030° C. to 2060° C. at 1.5° C. min$^{-1}$ | Y | Y |
| Hold at 2060° C. for 30 minutes | Y | Y |
| Cool to RT at 10° C. min$^{-1}$ until the natural cooling rate takes over. | Y | Y |

TABLE 19

Effect of firing cycle

| Example | 27 | 28 | 29 |
|---|---|---|---|
| SiC | 89.0 | 89.0 | 89.0 |
| Al$_2$O$_3$ | 10.0 | 10.0 | 10.0 |
| MgO | 1.0 | 1.0 | 1.0 |
| Carbon | 0.9 | 0.9 | 0.9 |
| Mass (g) | 248 | 248 | 70 |
| GBD (g · cc$^{-1}$) | 1.70 | 1.68 | 1.71 |
| Firing Cycle | I | II | II |
| FBD (g · cc$^{-1}$) | 3.20 | 3.18 | 3.20 |

TABLE 19-continued

Effect of firing cycle

| Example | 27 | 28 | 29 |
|---|---|---|---|
| Wt Change % | −5.8 | −5.9 | −8.0 |
| Comments | 2 | 1 | 2 |

Comments
Where
1 Low density core
2 Uniform

From the results it can be seen that the use of dwells in the middle temperature range is beneficial in increasing the fired bulk density of thick samples. In addition, it has been shown that a dwell or slowing down of the heating rate is beneficial as a result of the reaction of carbon with the silica inevitably present on the silicon carbide. The elimination of this silica is crucial to the successful densification of bodies. It will be appreciated that for thin bodies the deliberate elimination of the silica is not required as it is evolved during the heating cycle (Example 29). For thicker bodies, the reliance on the diffusion and elimination of the silica from the body is not practical. In addition, the firing of multiple samples can also increase the amount of time required for the elimination of silica or silicate phases from the samples as a result of a build up of silicon containing vapour species in the furnace atmosphere, stabilising the said silicon containing phases. The effect of furnace design could also be a factor in this process.

Examples 30–39

The effect of alumina and magnesia additions on densification were examined for a fixed firing cycle for thick specimens. The carbon addition was based on the amount of silicon carbide in the starting mix. The mass ratio of carbon to silicon carbide was 0.015. The sample preparation and the firing cycle used was the same as Example 22. The results of the firings are summarised in table 20.

TABLE 20

Effect of composition on densification

| Example | 30 | 31 | 32 | 33 | 34 |
|---|---|---|---|---|---|
| SiC | 95.0 | 93.4 | 91.9 | 89.9 | 87.0 |
| Al$_2$O$_3$ | 4.0 | 6.3 | 6.3 | 10.0 | 12.0 |
| MgO | 1.0 | 0.3 | 1.7 | 0.1 | 1.0 |
| Carbon | 1.4 | 1.4 | 1.4 | 1.3 | 1.3 |
| Mass (g) | 249 | 248 | 249 | 248 | 248 |
| GBD (g · cc$^{-1}$) | 1.68 | 1.70 | 1.71 | 1.70 | 1.71 |
| FBD (g · cc$^{-1}$) | 3.00 | 3.11 | 3.08 | 3.20 | 3.23 |
| % TD (calc) | 92.7 | 92.7 | 95.5 | 97.6 | 98.4 |
| Wt Change % | −3.9 | −4.0 | −5.4 | −4.5 | −5.8 |

| Example | 35 | 36 | 37 | 38 | 39 |
|---|---|---|---|---|---|
| SiC | 87.0 | 86.0 | 82.0 | 80.6 | 79.0 |
| Al$_2$O$_3$ | 12.0 | 12.0 | 17.7 | 17.7 | 20.0 |
| MgO | 1.0 | 2.0 | 0.3 | 1.7 | 1.0 |
| Carbon | 1.3 | 1.3 | 1.2 | 1.2 | 1.2 |
| Mass (g) | 248 | 248 | 248 | 248 | 248 |
| GBD (g · cc$^{-1}$) | 1.72 | 1.73 | 1.74 | 1.74 | 1.77 |
| FBD (g · cc$^{-1}$) | 3.22 | 3.23 | 3.29 | 3.27 | 3.30 |
| % TD (calc) | 98.3 | 98.4 | 99.0 | 98.7 | 99.1 |
| Wt Change % | −5.9 | −5.8 | −5.2 | −5.6 | −6.1 |

From the results it can be seen that in the range examined, increasing the alumina content had a greater effect on fired bulk density than the magnesia content. Low levels of addition of magnesia were effective in promoting densification. By contrast, to achieve greater than 95% of the theoretical density, alumina had to be added in excess of 6 weight percent. It can also be seen that there is good repeatability between firings (compare examples 34 and 35).

Example 40

The effect of alumina addition, in the upper range was examined for thick specimens. The carbon addition was based on the amount of silicon carbide in the starting mix. The mass ratio of carbon to silicon carbide was 0.015. The sample preparation used was the same as Example 22. The firing cycle is shown in table 21. The results of the firings are summarised in table 22.

TABLE 21

Summary of Firing Cycle

Heat to 600° C. at 5° C. min$^{-1}$ in Ar gas
Heat 600° C. to 1400° C. at 10° C. min$^{-1}$
Heat 1400° C. to 1550° C. at 5° C. min$^{-1}$
Hold at 1550° C. for 30 minutes
Heat 1550° C. to 1650° C. at 5° C. min$^{-1}$
Hold at 1650° C. for 30 minutes
Evacuate to 1 mm Hg and fill CO gas
Heat 1650° C. to 1900° C. at 5° C. min$^{-1}$
Hold at 1900° C. for 60 minutes
Heat 1900° C. to 2000° C. at 2.5° C. min$^{-1}$
Hold at temp for 60 minutes
Cool to room temperature at 10° C. min$^{-1}$
until the natural cooling rate takes over.

TABLE 22

Effect of composition on densification

| Example | 40 |
|---|---|
| SiC | 64.8 |
| Al$_2$O$_3$ | 35.0 |
| MgO | 1.8 |
| Carbon | 1.0 |
| Mass (g) | 248 |
| GBD (g · cc$^{-1}$) | 1.82 |
| FBD (g · cc$^{-1}$) | 3.27 |
| % TD (calc) | 97.1 |
| Wt Change % | -4.3 |

It can be seen that even in the upper limits of alumina addition, dense bodies can be produced. It is thought that high levels of alumina result in considerable levels of residual stresses as a consequence of the thermal expansion mismatch between alumina and silicon carbide.

It will be clearly understood that the invention in its general aspects is not limited to the specific details given hereinbefore.

I claim:

1. A process for the production of a dense polycrystalline silicon carbide shaped article, characterized in that the process includes the following steps:
   (a)(i.) forming a powder compact which contains silicon carbide and alumina or a precursor of alumina but excludes boron or boron containing compounds;
   (a)(ii.) heating the powder compact in an inert atmosphere to a temperature between 1400° and 1900° C.;
   (b) maintaining the powder compact in the temperature range between 1400° and 1900° C. in an inert atmosphere for at least 30 minutes and thereafter for a time sufficient to remove unstable inorganic species which adversely affect the densification of the compact; and
   (c) heating the product of step (b) to a temperature above 1900° C. in an atmosphere comprising carbon monoxide for at least 10 minutes and thereafter for a time sufficient to produce a dense polycrystalline silicon carbide product.

2. The process of claim 1, wherein said heating of step (c) is carried out for at least 60 minutes.

3. The process of claim 1 in which the powder compact heated in step (a) comprises magnesia or a precursor thereof.

4. The process of claim 1 in which the powder compact comprises magnesia or a precursor thereof in step (b).

5. The process of claim 1 in which the inert atmosphere comprises argon.

6. The process of claim 1 wherein any silica or silicate present is eliminated before the onset of densification in step (b).

7. The process of claim 6 in which the silica or silicate is eliminated by reaction with carbon.

8. The process of claim 1 in which step (c) is carried out at between 1900° and 2200° C.

9. The process of claim 1 carried out at ambient pressure.

10. A process for the production of a dense polycrystalline silicon carbide shaped article, characterized in that the process includes the following steps:
    (a)(i.) forming a powder compact comprising silicon carbide and alumina or a precursor of alumina but excludes boron or boron containing compounds;
    (a)(ii.) heating the powder compact to a temperature between 1400° and 1900° C.;
    (b) maintaining the powder compact in the temperature range of between 1600° and 1900° C. in an atmosphere comprising carbon monoxide, the powder compact being maintained in the temperature range for at least 30 minutes and thereafter for a time sufficient to remove unstable inorganic species which adversely affect the densification of the compact; and
    (c) heating the product of step (b) to a temperature above 1900° C. in an atmosphere comprising carbon monoxide for at least 10 minutes to produce a dense polycrystalline silicon carbide product.

11. The process of claim 10, wherein said heating of step (c) is carried out for at least 60 minutes.

12. The process of claim 10 in which in step (b), magnesia is present as a sintering assist.

13. The process of claim 10 in which the powder compact heated in step (a) comprises magnesia or a precursor thereof.

14. The process of claim 10 in which the powder compact comprises magnesia or a precursor thereof in step (b).

15. The process according to claim 10 wherein silica or silicate is eliminated before the onset of densification in step (b).

16. The process according to claim 10 in which the silica or silicate is eliminated by reaction with carbon.

17. The process according to claim 10 in which step (c) is carried out at between 1900° and 2200° C.

18. A process according to claim 10 carried out at ambient pressure.

19. A process for the production of a dense polycrystalline silicon carbide shaped article, characterized in that the process includes the following steps:
    (a)(i.) forming a powder compact which comprises silicon carbide and alumina or an alumina precursor but excludes boron or boron containing compounds;
    (a)(ii.) heating the powder compact in an inert atmosphere, to a temperature between 1400° and 1900° C.;

(b) maintaining the powder compact, in the temperature between 1400° and 1900° C. in a vacuum, said temperature being maintained for at least 30 minutes and thereafter to remove unstable inorganic species which adversely affect the densification of the compact; and (c) heating the product of step (b) to a temperature above 1900° C. in an atmosphere comprising carbon monoxide for at least 10 minutes, and thereafter for a time sufficient to produce a dense polycrystalline silicon carbide product.

20. The process of claim 19, wherein said heating of step (c) is carried out for at least 60 minutes.

21. The process according to claim 19 in which the powder compact heated in step (a) comprises magnesia or a precursor thereof.

22. The process according to claim 19 in which magnesia or a precursor thereof is added in step (b).

23. The process according to claim 19 wherein any silica or silicate present is eliminated before the onset of densification in step (b).

24. The process according to claim 19 in which step (c) is carried out at between 1900° and 2200° C.

* * * * *